United States Patent
Ramirez

(10) Patent No.: US 11,668,494 B2
(45) Date of Patent: Jun. 6, 2023

(54) SOLAR PANEL WASHING ASSEMBLY

(71) Applicant: Victor Ramirez, Lamont, CA (US)

(72) Inventor: Victor Ramirez, Lamont, CA (US)

( * ) Notice: Subject to any disclaimer, the term of this patent is extended or adjusted under 35 U.S.C. 154(b) by 307 days.

(21) Appl. No.: 17/152,450

(22) Filed: Jan. 19, 2021

(65) Prior Publication Data

US 2022/0228775 A1 Jul. 21, 2022

(51) Int. Cl.
*F24S 40/20* (2018.01)
*H02S 40/10* (2014.01)
*B08B 3/02* (2006.01)

(52) U.S. Cl.
CPC ............. *F24S 40/20* (2018.05); *B08B 3/02* (2013.01); *H02S 40/10* (2014.12)

(58) Field of Classification Search
CPC .......... B08B 3/02; H02S 40/10; F24S 40/20
See application file for complete search history.

(56) References Cited

U.S. PATENT DOCUMENTS

| D523,927 S | 6/2006 | Crowley | |
|---|---|---|---|
| 8,240,320 B2 | 8/2012 | Mertins | |
| 9,016,292 B1 | 4/2015 | Schneider | |
| 9,257,938 B2 | 2/2016 | Bourne | |
| 9,923,513 B2 | 3/2018 | Wang | |
| 9,973,141 B2 | 5/2018 | Hammad | |
| 10,447,199 B2 | 10/2019 | Naffaa | |
| 2002/0066473 A1* | 6/2002 | Levy | B08B 1/008 134/198 |
| 2009/0288691 A1* | 11/2009 | Hunt | F24S 40/20 134/57 R |
| 2012/0120641 A1* | 5/2012 | Yassa | B08B 3/04 362/183 |
| 2014/0116870 A1* | 5/2014 | Kamen | E04H 3/08 202/83 |
| 2017/0272030 A1* | 9/2017 | Chow | B05B 1/20 |
| 2019/0044476 A1 | 2/2019 | Al-Otaibi | |

FOREIGN PATENT DOCUMENTS

WO WO2016114814 7/2016

\* cited by examiner

*Primary Examiner* — Benjamin L Osterhout

(57) ABSTRACT

A solar panel washing assembly for automatically cleaning solar panels includes a plurality of solar panels that is each positionable on a support surface to be exposed to sunlight. A fluid supply pipe is fluidly coupled to a pressurized water source w to receive pressurized water and a control unit is positioned proximate the support surface. The control unit is fluidly coupled to the fluid supply pipe to receive the pressurized water. A plurality of distribution pipes is each fluidly coupled to the control unit to receive the pressurized water when the control unit actuated into the open condition. A plurality of spray nozzles is each fluidly coupled to a respective one of the distribution pipes to spray the pressurized water onto a respective solar panel to clean the respective solar panel.

8 Claims, 4 Drawing Sheets

SOLAR PANEL WASHING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to washing devices and more particularly pertains to a new washing device for automatically cleaning solar panels. The washing device is plumbed into a pressurized water source and the washing device includes a programmable control unit. The programmable control unit facilitates the washing device to automatically spray pressurized water onto the solar panels for cleaning the solar panels.

(2) Description of Related Art Including Information Disclosed Under 37 CFR 1.97 and 1.98

The prior art relates to washing devices including a variety of spraying devices that are integrated into solar panels for spraying water to clean the solar panels. The prior art discloses a roof mounted spraying device for cleaning roof mounted solar panels which is plumbed into a rain water storage tank. Additionally, the prior art discloses a solar panel cleaning device that employs an atmospheric water generator.

BRIEF SUMMARY OF THE INVENTION

An embodiment of the disclosure meets the needs presented above by generally comprising a plurality of solar panels that is each positionable on a support surface to be exposed to sunlight. A fluid supply pipe is fluidly coupled to a pressurized water source w to receive pressurized water and a control unit is positioned proximate the support surface. The control unit is fluidly coupled to the fluid supply pipe to receive the pressurized water. A plurality of distribution pipes is each fluidly coupled to the control unit to receive the pressurized water when the control unit actuated into the open condition. A plurality of spray nozzles is each fluidly coupled to a respective one of the distribution pipes to spray the pressurized water onto a respective solar panel to clean the respective solar panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
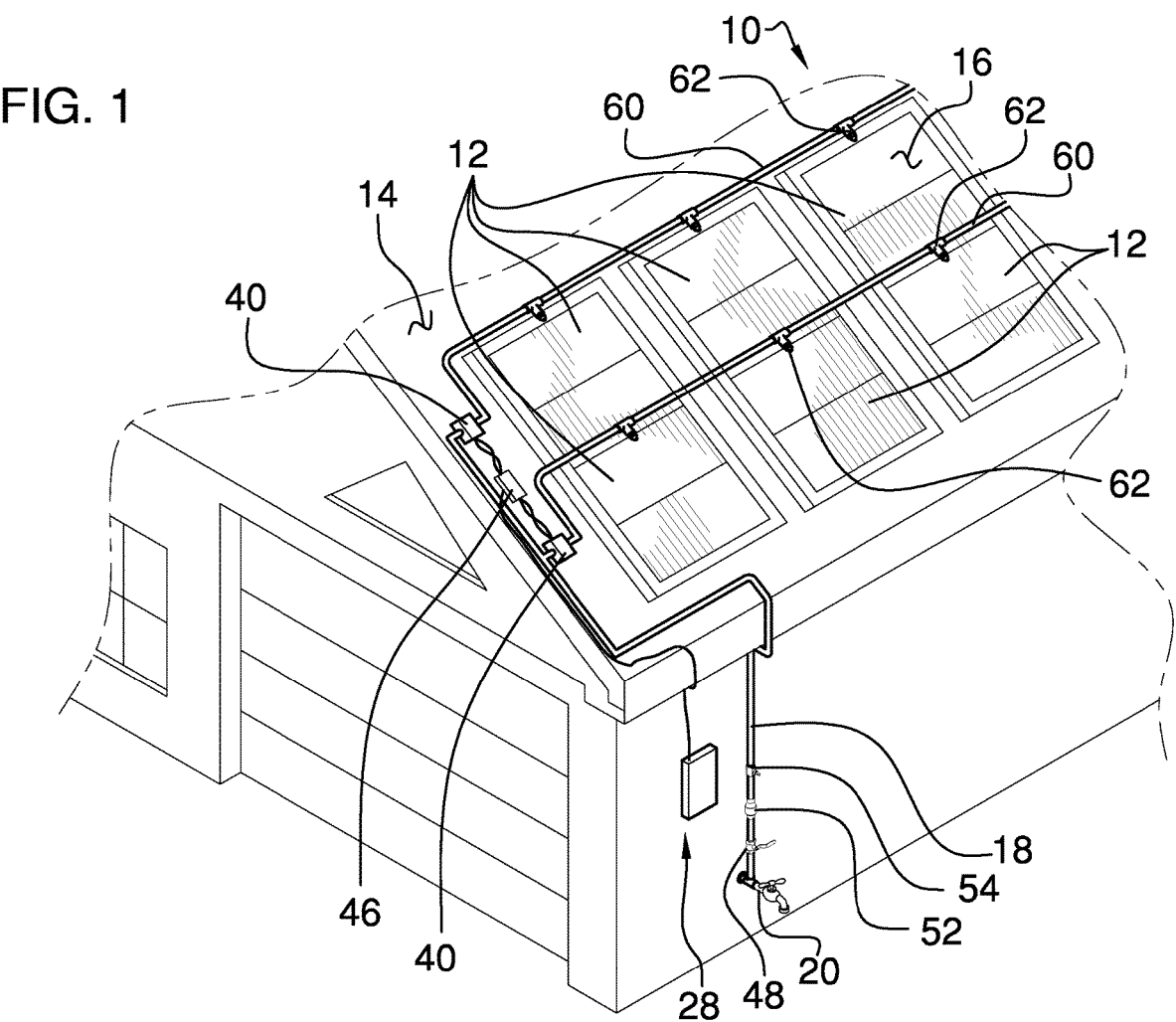
FIG. 1 is a perspective in-use view of a solar panel washing assembly according to an embodiment of the disclosure.
Figure 2:
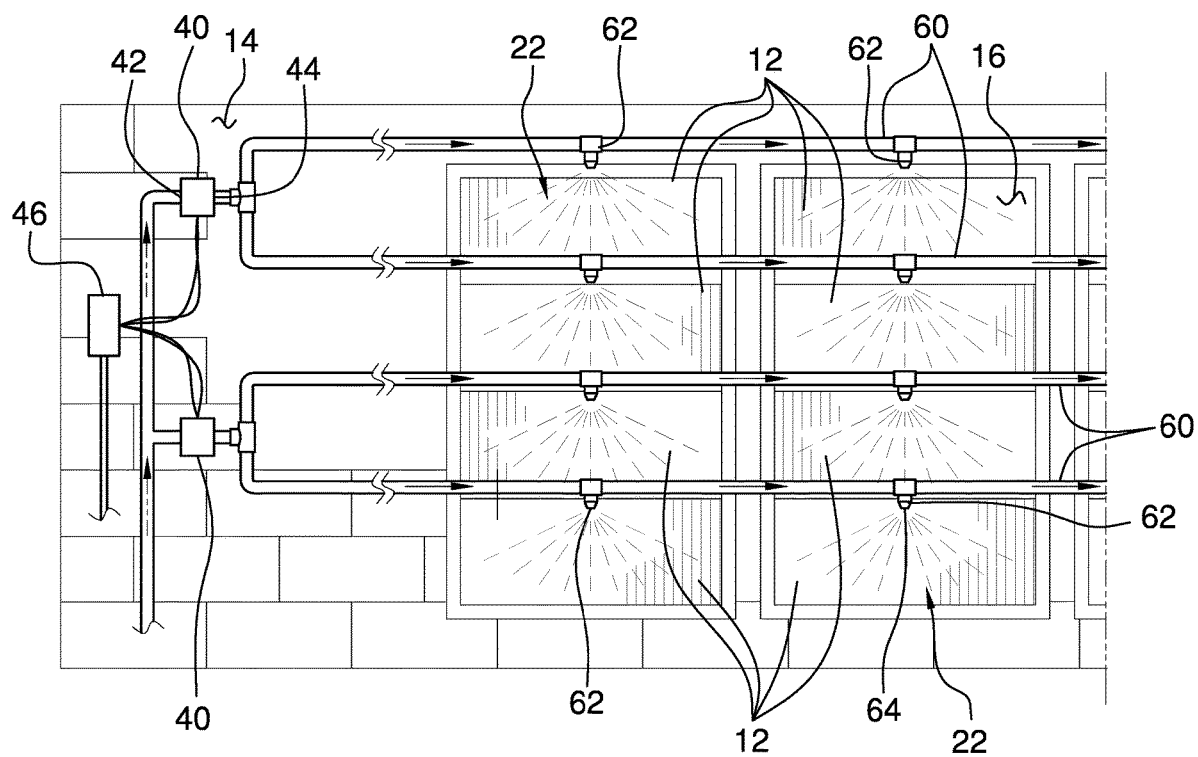
FIG. 2 is a top view of an embodiment of the disclosure.
Figure 3:
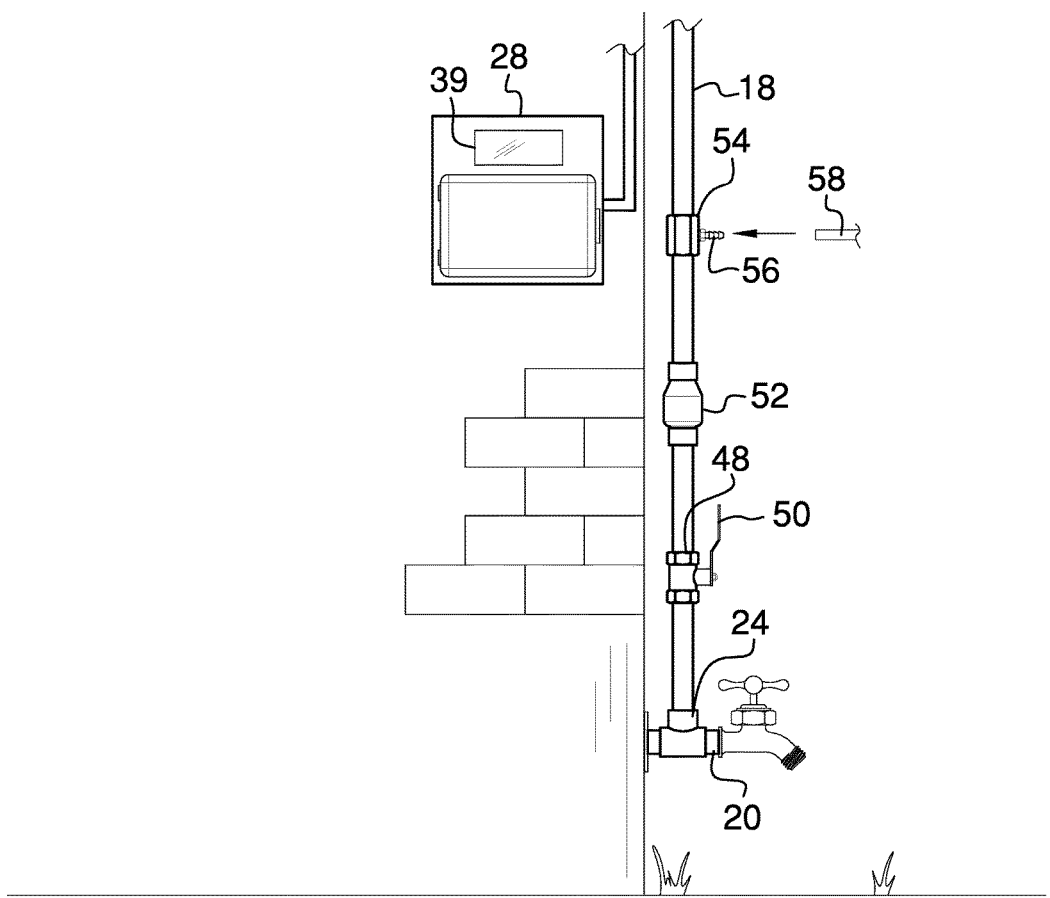
FIG. 3 is a perspective view of a control unit and a fluid supply pipe of an embodiment of the disclosure.
Figure 4:
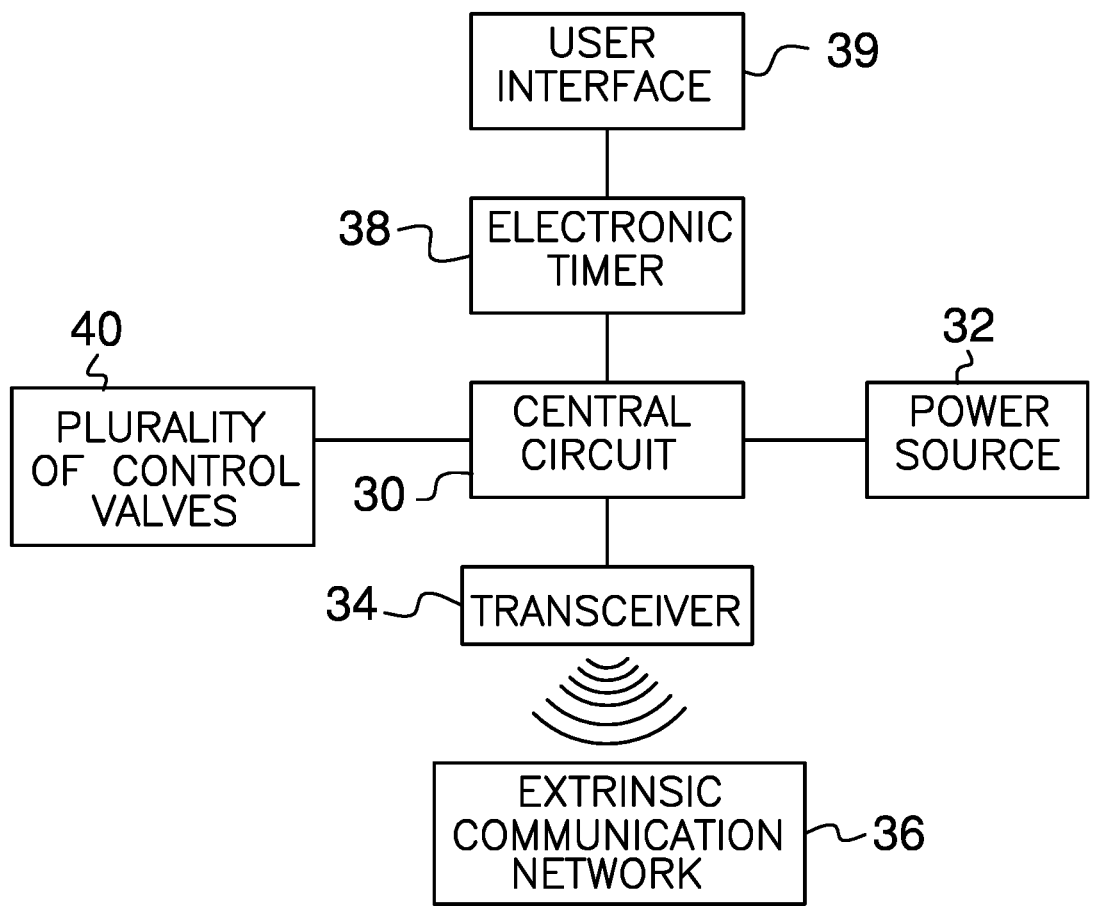
FIG. 4 is a schematic view of an embodiment of the disclosure.

With reference now to the drawings, and in particular to FIGS. 1 through 4 thereof, a new washing device embodying the principles and concepts of an embodiment of the disclosure and generally designated by the reference numeral 10 will be described.

As best illustrated in FIGS. 1 through 4, the solar panel washing assembly 10 generally comprises a plurality of solar panels 12 that is each positionable on a support surface 14 thereby facilitating each of the solar panels 12 to be exposed to sunlight. The support surface 14 may be the roof of a building, for example, or other support surface that is not easily accessible to an individual. Each of the solar panels 12 has an exposed surface 16 with respect to the support surface 14 and each of the solar panels 12 may be photovoltaic panels of any conventional design.

A fluid supply pipe 18 is provided and the fluid supply pipe 18 is fluidly coupled to a pressurized water source 20 to receive pressurized water 22. The pressurized water source 22 may be a water spigot on a building, for example, that is plumbed to a municipal water supply system. Additionally, the pressurized water source 20 may be a water pump that is in fluid communication with a rain water collection reservoir or the like. The fluid supply pipe 18 has a first end 24 and the first end 24 is fluidly coupled to the pressurized water source 20. The fluid supply pipe 18 is strategically routed to facilitate the fluid supply pipe 18 to be positioned on the support surface 14.

A control unit 28 is provided and the control unit 28 is positioned proximate the support surface 14. The control unit 28 is fluidly coupled to the fluid supply pipe 18 to receive the pressurized water 22. The control unit 28 is programmable to be actuated into an open condition at pre-determined times of day to release the pressurized water 22. The control unit 28 comprises a control circuit 30 that receives an open input and a close input, and the control circuit 30 is electrically coupled to a power source 32. The control unit 28 may include a transceiver 34 that is electrically coupled to the control circuit 30 and the transceiver 34 may be in wireless communication with an extrinsic communication network 36, such as the internet or the like. Additionally, the transceiver 34 may comprise a radio frequency transceiver or the like and the transceiver 34 may employ a WPAN signal.

An electronic timer 38 is electrically coupled to the control circuit 30 and the electronic timer 38 is programmable to count down a pre-determined duration of time. The control circuit 30 receives the open input when the electronic timer 38 begins counting down the pre-determined duration of time. The control circuit 30 receives the off input when the electronic timer 38 completes counting down the pre-determined duration of time. Additionally, the electronic timer 38 is programmable to count down the pre-determined duration of time at pre-determined intervals. The electronic timer 38 may be programmed via a personal electronic device that is in communication with the transceiver 34. Additionally, as is most clearly shown in FIG. 3, the control unit 28 might include a user interface 39, such as a touch screen or the like, to facilitate the electronic timer 38 to be programmed.

A plurality of control valves 40 is each positioned on the support surface 14 and each of the control valves 40 is electrically coupled to the control circuit 30. Each of the control valves 40 has an input 42 and an outlet 44, and the input 42 of each of the control valves 40 is in fluid communication with the fluid supply pipe 18. In this way each of the control valves 40 can receive the pressurized water 22. Each of the control valves 40 is actuatable into a closed condition to inhibit the pressurized water 22 from passing through the outlet 44. Additionally, each of the control valves 40 is actuatable into an open condition to facilitate the pressurized water 22 to pass through the outlet 44.

Each of the control valves 40 may comprise an electrically controlled fluid valve or the like. Each of the control valves 40 is actuated into the closed condition when the control circuit 30 receives the close input. Conversely, each of the control valves 40 is actuated into the open condition when the control circuit 30 receives the open input. A junction box 46 is positioned on the support surface 14 and the junction box 46 is electrically coupled between the control circuit 30 and each of the control valves 40.

A shut off valve 48 is fluidly coupled to the fluid supply pipe 18, and the shut off valve 48 is positioned between the pressurized water source 20 and the control unit 28. The shut off valve 48 is positionable in a closed condition to inhibit the pressurized water 22 from flowing to the control unit 28. The shut off valve 48 is positionable in an open condition to facilitate the pressurized water 22 to flow to the control unit 28. The shut off valve 48 may include a lever 50 that is manipulated to move the shut off valve 48 between the open condition and the closed condition. Additionally, the shut off valve 48 may comprise a fluid valve such as a ball valve or the like.

A check valve 52 is fluidly coupled to the fluid supply pipe 18 and the check valve 52 is positioned between the shut off valve 48 and the control unit 28. The check valve 52 has a single direction of flow to facilitate the pressurized water 22 to flow from the shut off valve 48 to the control unit 28 and to inhibit the pressurized water 22 from flowing from the control unit 28 to the shut off valve 48. In this way the check valve 52 inhibits backflow of the pressurized water 22 in the fluid supply pipe 18. The check valve 52 may comprise a single direction fluid valve of any conventional design.

An injection port 54 is provided and the injection port 54 is fluidly coupled to the fluid supply pipe 18. The injection port 54 has an inlet 56 that can be fluidly coupled to a chemical source 58 for mixing a chemical with the pressurized water 22 in the fluid supply pipe 18. The chemical may comprise a detergent or other type of chemical that would commonly be added to water for enhancing the injection port 54 is positioned between the check valve 52 and the control unit 28. The injection port 54 may comprise a fluid injection port or the like that facilitates the pressurized water 22 to flow unimpeded therethrough and which can also mix a fluid chemical into the flow of the pressurized water 22.

A plurality of distribution pipes 60 is provided and each of the distribution pipes 60 is fluidly coupled to the control unit 28 to receive the pressurized water 22 when the control unit 28 is actuated into the open condition. Each of the distribution pipes 60 is routed along respective ones of the solar panels 12 and each of the distribution pipes 60 is positioned on the exposed surface 16 of the respective solar panels 12. Each of the distribution pipes 60 is fluidly coupled to the outlet 44 of the respective control valves 40.

A plurality of spray nozzles 62 is provided and each of the spray nozzles 62 is fluidly coupled to a respective one of the distribution pipes 60 to receive the pressurized water 22. Each of the spray nozzles 62 is aligned with a respective one of the solar panels 12 to spray the pressurized water 22 onto the respective solar panel 12 to clean the respective solar panel 12. Each of the spray nozzles 62 has a distal end 64 with respect to the respective distribution pipe 60 and the distal end 64 has a spray aperture 66 extending into the spray nozzles 62. In this way the spray aperture 66 can spray the pressurized water 22. The distal end 64 of each of the spray nozzles 62 is directed toward the exposed surface 16 of the respective solar panel 12 to spray the pressurized water 22 onto the exposed surface 16 for cleaning the exposed surface 16.

In use, the control unit 28 is programmed to determine when and for how long the control unit 28 will be actuated into the open condition. The spray nozzles 62 automatically spray the pressurized water 22 onto the exposed surface 16 of the solar panels 12 when the control unit 28 is actuated into the open condition. In this way the solar panels 12 can be cleaned without requiring an individual to climb onto a roof, for example, to manually clean the solar panels 12. Additionally, the solar panels 12 are able to operate at maximum efficiency by being automatically cleaned at regular intervals.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A solar panel washing system for automatically spraying water onto solar panels to wash the solar panels, said system comprising:
    a plurality of solar panels, each of said solar panels being positionable on a support surface wherein each of said solar panels is configured to be exposed to sunlight;
    a fluid supply pipe being fluidly coupled to a pressurized water source wherein said fluid supply pipe is configured to receive pressurized water;
    a control unit being positioned proximate said support surface, said control unit being fluidly coupled to said fluid supply pipe wherein said control unit is configured to receive the pressurized water, said control unit being programmable to be actuated into an open condition at pre-determined times of day wherein said control unit is configured to release the pressurized water;
    a plurality of distribution pipes, each of said distribution pipes being fluidly coupled to said control unit wherein each of said distribution pipes is configured to receive the pressurized water when said control unit actuated into said open condition, each of said distribution pipes being routed along respective ones of said solar panels; and
    a plurality of spray nozzles, each of said spray nozzles being fluidly coupled to a respective one of said distribution pipes wherein each of said spray nozzles is configured to receive the pressurized water, each of said spray nozzles being aligned with a respective one of said solar panels wherein each of said spray nozzles is configured to spray the pressurized water onto said respective solar panel to clean said respective solar panel;
    a shut off valve being fluidly coupled to said fluid supply pipe, said shut off valve being positioned between said pressurized water source and said control unit, said shut off valve being positionable in a closed condition wherein said shut off valve is configured to inhibit the pressurized water from flowing to said control unit, said shut off valve being positionable in an open condition wherein said shut off valve is configured to facilitate the pressurized water to flow to said control unit; and
    a check valve being fluidly coupled to said fluid supply pipe, said check valve being positioned between said shut off valve and said control unit, said check valve having a single direction of flow wherein said check valve is configured to facilitate the pressurized water to flow from said shut off valve to said control unit and inhibit the pressurized water from flowing from said control unit to said shut off valve.

2. The system according to claim 1, wherein said control unit comprises:
    a control circuit receiving an open input and a close input, said control circuit being electrically coupled to a power source; and
    an electronic timer being electrically coupled to said control circuit, said electronic timer being programmable to count down a pre-determined duration of time, said control circuit receiving said open input when said electronic timer begins counting down said pre-determined duration of time, said control circuit receiving said off input when said electronic timer completes counting down said pre-determined duration of time, said electronic timer being programmable to count down said pre-determined duration of time at pre-determined intervals.

3. The system according to claim 2, wherein:
    said fluid supply pipe has a first end and a second end, said first end being fluidly coupled to said pressurized water source, said fluid supply pipe being strategically routed to facilitate said second end to be positioned on said support surface; and
    said control unit comprises a plurality of control valves, each of said control valves being positioned on said support surface, each of said control valves being electrically coupled to said control circuit, each of said control valves having an input and an outlet, said input of each of said control valves being in fluid communication with said second end of said fluid supply pipe wherein each of said control valves is configured to receive the pressurized water.

4. The system according to claim 3, wherein each of said control valves is actuable into a closed condition wherein each of said control valves is configured to inhibit the pressurized water from passing through said outlet, each of said control valves being actuatable into an open condition wherein each of said control valves is configured to facilitate the pressurized water to pass through said outlet, each of said control valves being actuated into said closed condition when said control circuit receives said close input, each of said control valves being actuated into said open condition when said control circuit receives said open input.

5. The system according to claim 1, further comprising an injection port being fluidly coupled to said fluid supply pipe, said injection port having an inlet wherein said inlet is configured to be fluidly coupled to a chemical source for mixing the chemical with the pressurized water in said fluid supply pipe, said injection port being positioned between said check valve and said control unit.

6. The system according to claim 1, wherein:
    each of said solar panels has an exposed surface with respect to said support surface; and
    each of said distribution pipes is positioned on said exposed surface of said respective solar panels.

7. The system according to claim 6, wherein each of said spray nozzles has a distal end with respect to said respective distribution pipe, said distal end having a spray aperture extending into said spray nozzles wherein said spray aperture is configured to spray the pressurized water, said distal end of each of said spray nozzles being directed toward said exposed surface of said respective solar panel wherein each of said spray nozzles is configured to spray the pressurized water onto said exposed surface for cleaning said exposed surface.

8. A solar panel washing system for automatically spraying water onto solar panels to wash the solar panels, said system comprising:
    a plurality of solar panels, each of said solar panels being positionable on a support surface wherein each of said solar panels is configured to be exposed to sunlight, each of said solar panels having an exposed surface with respect to said support surface;

a fluid supply pipe being fluidly coupled to a pressurized water source wherein said fluid supply pipe is configured to receive pressurized water, said fluid supply pipe having a first end and a second end, said first end being fluidly coupled to said pressurized water source, said fluid supply pipe being strategically routed to facilitate said second end to be positioned on said support surface;

a control unit being positioned proximate said support surface, said control unit being fluidly coupled to said fluid supply pipe wherein said control unit is configured to receive the pressurized water, said control unit being programmable to be actuated into an open condition at pre-determined times of day wherein said control unit is configured to release the pressurized water, said control unit comprising:
  a control circuit receiving an open input and a close input, said control circuit being electrically coupled to a power source;
  an electronic timer being electrically coupled to said control circuit, said electronic timer being programmable to count down a pre-determined duration of time, said control circuit receiving said open input when said electronic timer begins counting down said pre-determined duration of time, said control circuit receiving said off input when said electronic timer completes counting down said pre-determined duration of time, said electronic tinier being programmable to count down said pre-determined duration of time at pre-determined intervals;
  a plurality of control valves, each of said control valves being positioned on said support surface, each of said control valves being electrically coupled to said control circuit, each of said control valves having an input and an outlet, said input of each of said control valves being in fluid communication with said second end of said fluid supply pipe wherein each of said control valves is configured to receive the pressurized water, each of said control valves being actuatable into a closed condition wherein each of said control valves is configured to inhibit the pressurized water from passing through said outlet, each of said control valves being actuatable into an open condition wherein each of said control valves is configured to facilitate the pressurized water to pass through said outlet, each of said control valves being actuated into said closed condition when said control circuit receives said close input, each of said control valves being actuated into said open condition when said control circuit receives said open input; and
  a junction box being positioned on said support surface, said junction being electrically coupled between said control circuit and each of said control valves;

a shut off valve being fluidly coupled to said fluid supply pipe, said shut off valve being positioned between said pressurized water source and said control unit, said shut off valve being positionable in a closed condition wherein said shut off valve is configured to inhibit the pressurized water from flowing to said control unit, said shut off valve being positionable in an open condition wherein said shut Off valve is configured to facilitate the pressurized water to flow to said control unit;

a check valve being fluidly coupled to said fluid supply pipe, said check valve being positioned between said shut off valve and said control unit, said check valve having a single direction of flow wherein said check valve is configured to facilitate the pressurized water to flow from said shut off valve to said control unit and inhibit the pressurized water from flowing from said control unit to said shut off valve;

an injection port being fluidly coupled to said fluid supply pipe, said injection port having an inlet wherein said inlet is configured to be fluidly coupled to a chemical source for mixing the chemical with the pressurized water in said fluid supply pipe, said injection port being positioned between said check valve and said control unit;

a plurality of distribution pipes, each of said distribution pipes being fluidly coupled to said control unit wherein each of said distribution pipes is configured to receive the pressurized water when said control unit actuated into said open condition, each of said distribution pipes being routed along respective ones of said solar panels, each of said distribution pipes being positioned on said exposed surface of said respective solar panels, each of said distribution pipes being fluidly coupled to said outlet of a respective one of said control valves; and a plurality of spray nozzles, each of said spray nozzles being fluidly coupled to a respective one of said distribution pipes wherein each of said spray nozzles is configured to receive the pressurized water, each of said spray nozzles being aligned with a respective one of said solar panels wherein each of said spray nozzles is configured to spray the pressurized water onto said respective solar panel to clean said respective solar panel, each of said spray nozzles having a distal end with respect to said respective distribution pipe, said distal end having a spray aperture extending into said spray nozzles wherein said spray aperture is configured to spray the pressurized water, said distal end of each of said spray nozzles being directed toward said exposed surface of said respective solar panel wherein each of said spray nozzles is configured to spray the pressurized water onto said exposed surface for cleaning said exposed surface.

* * * * *